United States Patent
Seitz et al.

(10) Patent No.: US 7,296,364 B2
(45) Date of Patent: Nov. 20, 2007

(54) SENSOR MODULE FOR A PROBE HEAD OF A TACTILE COORDINATED MEASURING MACHINE

(75) Inventors: Karl Seitz, Oberkochen (DE); Wolfgang Strauss, Staig (DE); Roland Roth, Waldstetten (DE); Walter Dominicus, Königsbronn (DE)

(73) Assignee: Calr Zeiss Industrielle Messtechnik GmbH, Oberkochen (DE)

( * ) Notice: Subject to any disclaimer, the term of this patent is extended or adjusted under 35 U.S.C. 154(b) by 0 days.

(21) Appl. No.: 11/656,364

(22) Filed: Jan. 22, 2007

(65) Prior Publication Data

US 2007/0180722 A1    Aug. 9, 2007

Related U.S. Application Data

(63) Continuation of application No. PCT/EP2005/005622, filed on May 25, 2005.

(30) Foreign Application Priority Data

Jul. 23, 2004    (DE) ...................... 10 2004 037 490

(51) Int. Cl.
*G01B 5/012* (2006.01)
(52) U.S. Cl. ...................................... 33/559
(58) Field of Classification Search ................. 33/503, 33/556, 559, 560, 561
See application file for complete search history.

(56) References Cited

U.S. PATENT DOCUMENTS

| | | | | |
|---|---|---|---|---|
| 4,279,080 A | * | 7/1981 | Nakaya | 33/561 |
| 4,451,988 A | | 6/1984 | McMurtry | 33/561 |
| 4,859,817 A | * | 8/1989 | Cassani | 33/561 |
| 5,509,211 A | * | 4/1996 | Ernst | 33/558 |
| 5,548,902 A | * | 8/1996 | Ernst | 33/561 |
| 5,594,995 A | * | 1/1997 | Matsuhashi | 33/558 |
| 5,839,202 A | * | 11/1998 | Tezuka et al. | 33/503 |
| 6,516,529 B2 | * | 2/2003 | Hidaka et al. | 33/561 |
| 2004/0118000 A1 | | 6/2004 | Roth et al. | 33/556 |

FOREIGN PATENT DOCUMENTS

| | | |
|---|---|---|
| DE | 93 20 596.1 | 11/1994 |
| DE | 101 08 774 A1 | 9/2002 |
| WO | WO 2004/051181 | 6/2004 |

OTHER PUBLICATIONS

Thomas Kleine-Besten et al.; Miniaturized 3D Touch Sensor For Metrology On Microstructures; Dec. 1999; 16 pages.

* cited by examiner

*Primary Examiner*—G. Bradley Bennett
(74) *Attorney, Agent, or Firm*—Harness, Dickey, & Pierce, P.L.C.

(57) ABSTRACT

A sensor module for a probe head of a tactile coordinate measuring machine has a frame forming a stationary module base, thereby defining a first measurement plane. A moving part is connected to the frame via webs. Each web has a thick-material web portion arranged between two thin-material web portions, if seen in a cross section perpendicularly to the first measurement plane. The thick-material web portion has a material thickness greater than the corresponding material thickness of the thin-material web portions.

20 Claims, 4 Drawing Sheets

SENSOR MODULE FOR A PROBE HEAD OF A TACTILE COORDINATED MEASURING MACHINE

CROSS REFERENCES TO RELATED APPLICATIONS

This application is a continuation of international patent application PCT/EP2005/005622, filed on May 25, 2005 designating the U.S., which international patent application has been published in German language and claims priority from German patent application De 10 2004 037 490.2, filed on Jul. 23, 2004. The entire contents of these priority applications are incorporated herein by reference.

BACKGROUND OF THE INVENTION

The present invention relates to a sensor module for a probe head of a tactile coordinate measuring machine, and to a probe head comprising such a sensor module and a stylus attached to the sensor module.

In the prior art, coordinate measuring machines are used inter alia for measuring the shape of a measurement object with high accuracy. For example, the shape of workpieces produced by machine may be checked in this way in the course of quality control. For the measurement process, the probe head of the coordinate measuring machine is moved towards the measurement object by means of a suitable movement mechanism until the stylus touches a desired measurement point on the measurement object. The spatial coordinates of the measurement point can then be determined from the position of the probe head and, if appropriate, from the relative position of the stylus with respect to the sensor module.

German patent application DE 101 08 774 A1 discloses a probe head in which the stylus is arranged on a lateral mount. In an embodiment, the lateral mount comprises a stationary frame having a square base area, at whose center a part is arranged which can move relative to the frame. The moveable part is sometimes referred to as a "boss" by the skilled persons, and it carries the stylus. In the described embodiment, the boss is connected to the frame either via four or via eight webs. When the stylus is deflected, the webs are twisted, and this can be evaluated by means of strain sensors arranged on the sensor module. In this embodiment, the frame, the webs and the boss are produced from a solid silicon body by an etching process.

The basic concept of such a sensor module is also discussed in an article by Kleine-Besten et al. entitled "Miniaturisierter 3D-Tastsensor für die Metrologie an Mikrostrukturen" [Miniaturized 3D Probe Sensor for Metrology of Microstructures], which appeared in the German Journal "tm—Technisches Messen" [tm—Technical Measurement], Issue 12/99, pages 490-495. This article describes investigation results on a semiconductor sensor module, wherein, in contrast to DE 101 08 774 A1, the boss of the sensor module is held on the frame via a single solid membrane. The use of individual webs for holding the boss, as disclosed by DE 101 08 774 A1, is mentioned in a brief outlook at the end of the article in connection with ideas for compensating different bending stiffnesses of the module in the three spatial directions. This is because the investigation of the sensor module having the solid membrane has shown that the bending stiffness is considerably less when the stylus is deflected in a plane parallel to the frame (X direction or Y direction) than when it is deflected perpendicularly to the frame (Z direction).

The use of webs for mounting the boss and the stylus rather than a solid membrane leads to some degree of matching the bending stiffnesses in the three special directions. However, there are still considerable difficulties in scanning measurement processes, i.e. measurement processes in which the probe head is guided in continuous contact with the measurement object (what is referred to as "scanning"). It is still very problematic to determine the deflection in the Z direction in such measurement scenarios, despite the matching of the bending stiffnesses already achieved so far by means of the webs.

SUMMARY OF THE INVENTION

Against this background, it is an object of the invention to provide for a sensor module for use in a probe head of a coordinate measuring machine, which allows to carry out scanning measurement processes more easily and more accurately.

It is another object to provide for a probe head for a tactile coordinate measuring machine, which facilitates scanning measurements on a measurement object, even if the measurement object is very small and a high measurement accuracy is desired.

According to one aspect of the invention, there is provided a sensor module for a probe head of a tactile coordinate measuring machine, the sensor module comprising a frame which forms a stationary module base and thereby defines a first measurement plane, and comprising a moving part configured to move relative to the frame and configured to hold the proximal end of a stylus, wherein the moving part is held on the frame via at least two webs separated from one another, wherein each web has a cross section perpendicularly to the first measurement plane, with the cross section showing a first web portion having a first material thickness and two second web portions having at least a second material thickness, wherein the first web portion is arranged between the two second web portions, and wherein the first material thickness is thicker than the second thickness.

According to another aspect, there is provided a probe head for a tactile coordinate measuring machine, the probe head comprising a sensor module having a frame which forms a stationary module base and thereby defines a first measurement plane, and having a moving part configured to move relative to the frame and configured to hold a first end of a stylus, wherein the moving part is held on the frame via at least two separate webs, wherein each web has a thick-material web portion arranged between two thin-material web portions in a cross section perpendicularly to the first measurement plane.

Previous approaches relating to sensor modules for coordinate measuring machines of this kind tried to make the cross section of the membrane area between the frame and the moving part ("boss") as thin as possible, in order to obtain as much flexibility as possible in the Z direction. The present approach differs from these prior approaches in that the webs are formed with a thick-material area or portion, i.e. with a material thickness considerably greater than the minimum thickness that is technically possible. Practical experiments have shown that it is sufficient to provide two thin-material web portions in order to achieve a relatively low stiffness in the Z direction. On the other hand, the thick-material web portion located between the thin web portions provide greater torsional stiffness in the X direction and Y direction. The bending stiffnesses in the three spatial directions are thus better matched to one another compared to previous approaches. Due to the better matching, it is easier to determine the deflection of the stylus in the Z direction, in particular in the case of scanning measurement processes, in which the stylus might be deflected in all three spatial directions at a time. Because the deflection behavior is matched considerably better, the novel sensor module can carry out scanning measurement processes more easily and more accurately.

In a preferred refinement, the material thickness of the thin-material web portions is at most 50% of the material thickness of the thick-material web portion, preferably at most 30% and even more preferably about 3% to 10%.

In general, it can be said that the bending stiffness in the Z direction on the one hand and in the X/Y directions on the other hand are better matched to one another the thinner the thin-material web portions are compared to the thick-material web portion. The present refinement, however, takes into account adequate resistance to fracture. This further improves the reliable implementation of scanning measurement processes.

In a further refinement, the webs have a web width and a web length parallel to the first measurement plane, with the web width being at least one third, and preferably about one half of the web length or more.

These ratios of the length to the width of the webs improve the torsional stiffness and thus contribute to further matching the bending stiffness in the X/Y directions on the one hand and in the Z direction on the other. This further facilitates the implementation of scanning measurement processes.

In a further refinement, the thin-material web portions and the thick-material web portion have approximately the same web width.

In principle, as an alternative to this, it would also be possible to make the thin-material web portions broader or narrower as the thick-material web portion. However, thinner thin-material web portions would result in a reduction in the torsional stiffness, which would be disadvantageous from the point of view of matching of the bending stiffness. The preferred embodiment of the web portions with approximately the same web width avoids this disadvantage, and on the other hand can be achieved easily from the production engineering point of view. Furthermore, the novel sensor module of this refinement has good robustness for scanning measurements, despite the unequal material thicknesses of the web portions.

In a further refinement, the thin-material web portions are formed as slots extending transversely with respect to the web, wherein each slot has a slot width in the direction of the web, and wherein the slot width is at most 20% of the length of the thick-material area, preferably about 2% to 10%.

Investigations by the applicant have shown that the matching of the bending stiffnesses becomes better the smaller the thin-material web portions are with respect to the web length of the thick-material area. The above orders of magnitude have been found to be particularly advantageous, with respect to the desired bending stiffnesses on the one hand and with respect to the robustness of the sensor module on the other hand.

In a further refinement, the thin-material web portions form connection points of the web to the frame and to the moving part.

This refinement is based on the discovery that the desired matching of the bending stiffnesses in the three spatial directions becomes better the further the thin-material web portions of each web are away from one another. The formation of the thin-material web portions as connection points for the web to the frame and to the moving part represents the preferred refinement, because the distance between the thin-material web portions is a maximum in this refinement.

In a further refinement, the moving part has a cruciform shape in a view perpendicularly to the first measurement plane.

This refinement allows robust connection of the webs to the moving part ("boss"), in particular in view of the fact that the thin-material web portions are intrinsically more sensitive to fracture loads than thick-material web portions. The cruciform shape allows stable transitions in the area of the connection points. The moving part is preferably designed in the form of a "short-arm cross", with very short free ends. In this refinement, the advantage of thin-material web portions which are as far away from one another as possible is combined with the stability of the cruciform moving part.

In an alternative refinement, however, the moving part is square in a view perpendicularly to the first measurement plane.

This refinement leads to a structure which is very simple from the production engineering point of view and has maximum web lengths.

In a further refinement, the frame has a material thickness which is approximately the same as the material thickness of the thick-material web portion in a cross section perpendicularly to the first measurement plane.

This refinement can be produced easily from the production engineering point of view on the one hand, and it contributes to particularly good matching of the bending stiffness in the spatial directions X/Y and Z on the other hand. It is particularly preferable that the frame and the thick-material web portions have approximately the same thickness as a typical silicon wafer. This results in high robustness with low production costs.

In a further refinement, the frame and the webs have side flanks, which run substantially perpendicularly to the first measurement plane.

This refinement allows the thin-material web portions to be very small in the longitudinal direction of the webs. The bending stiffness in the three spatial directions can thus be matched to one another even better. It is even easier to carry out an exact scanning measurement.

In a further refinement, the frame and the webs are etched out of a solid semiconductor material, preferably by means of a dry-etching method.

This refinement has the advantage that very small sensor modules can be produced, whose bending stiffness in the three spatial directions are well matched to one another. This applies in particular to the use of a dry-etching method in contrast to wet-etching methods, because it has been found that steeper edge profiles and contours can be achieved by dry etching. The preferred refinement of substantially perpendicular side flanks is thus feasible particularly easily and at low cost by using a dry-etching method.

In a further refinement, the webs are separated from the frame only by a continuous groove.

In other words, in this refinement, the sensor module is largely in the form of a solid body, from which the webs and the moving parts are machined by introduction of relatively narrow slots. In this case, the solid body preferably has a substantially square base area. The slots pass through the solid body parallel to the longitudinal faces of the webs, in order to achieve the separation of the web and frame. In contrast, the slots on the lateral-face ends of the webs, that is to say at their connection points to the frame and to the moving part, do not extend entirely as far as the base of the solid body, so that the thin-material web portions remain here.

From the present point of view, this refinement is particularly preferable because, on the one hand, it allows very high manufacturing precision. This is because it has been found that the depth profile, which is important for the present invention, when etching out the thin-material web portions can be produced more exactly if only relatively narrow material parts are etched out of the solid body.

Furthermore, this refinement has the advantage that the frame has relatively large fixed surface areas, which can be used advantageously for an inscription or for fitting of an electronic data memory for identification and/or calibration data.

In a further refinement, the sensor module comprises a stylus which is attached to the moving part in a non-removable manner.

In this refinement, the sensor module is some sort of a "disposable item" which is a fundamental reversal of previous approaches with stylus units for coordinate measuring machines. While it was heretofore typical to design the probe head sensor system to be stationary and, if appropriate, to replace the stylus, this refinement takes the approach of the stylus and sensor system forming a stylus/sensor module which can be replaced in its entirety. The refinement has the advantage that the characteristics of the stylus can be taken into account in an optimum manner in the design of the bending stiffness. The behavior of the novel sensor module can thus be matched even better to continuous measurement processes.

In a further refinement, the stylus has a stylus length which is approximately twice to six times of the web length.

This refinement exploits the above-mentioned advantages by including the length of the stylus in the design of the sensor module. The above order of magnitude makes this refinement highly suitable for carrying out continuous measurement processes.

In a further refinement, the sensor module comprises a plurality of sensor elements which are arranged in the area of the webs, and a plurality of electrical contact surfaces for connecting the sensor elements, wherein the contact surfaces are arranged on the frame, and preferably on a side of the frame facing away from the stylus.

This refinement also contributes to making the novel sensor module a completely integrated unit, which is arranged on a probe head as an entity. In this case, it is particularly preferable to position the electrical contact surfaces on the rear face of the frame, because this allows the sensor module to be replaced very easily. Irrespective of this, the arrangement of the contact surfaces on the frame has the advantage that the bending stiffness and thus the measurement response of the sensor module are not influenced by the connection to the probe head. This allows continuous measurements to be carried out with high accuracy, even after replacement of the sensor module.

BRIEF DESCRIPTION OF THE DRAWINGS

It goes without saying that the features mentioned above and those yet to be explained below can be used not only in the respectively stated combination but also in other combinations or on their own, without departing from the scope of the present invention.

Exemplary embodiments of the invention will be explained in more detail in the following description and are illustrated in the drawing, in which.

DESCRIPTION OF PREFERRED EMBODIMENTS

Figure 1:
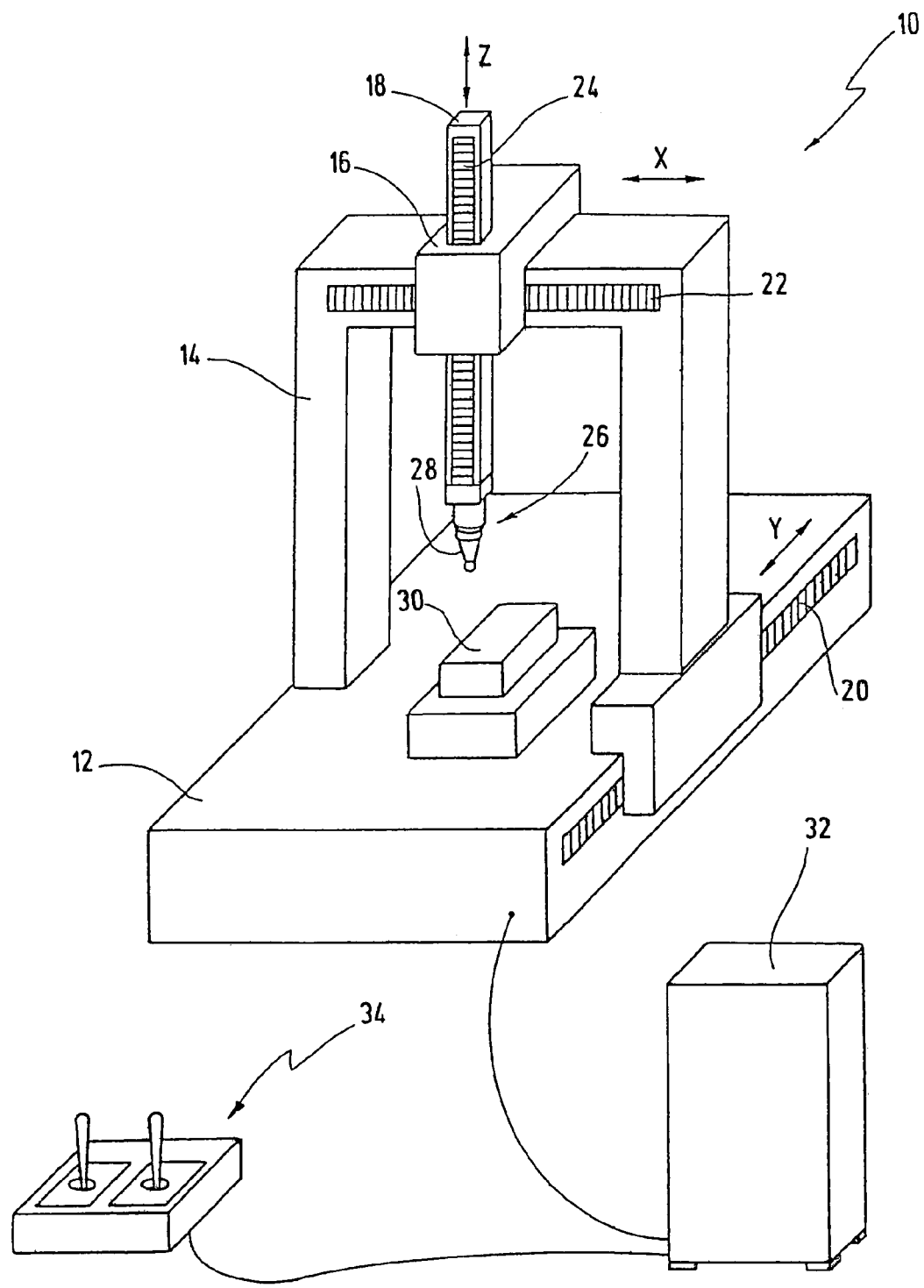
FIG. 1 shows a simplified illustration of a coordinate measuring machine, in which the novel sensor module is used.
Figure 2:
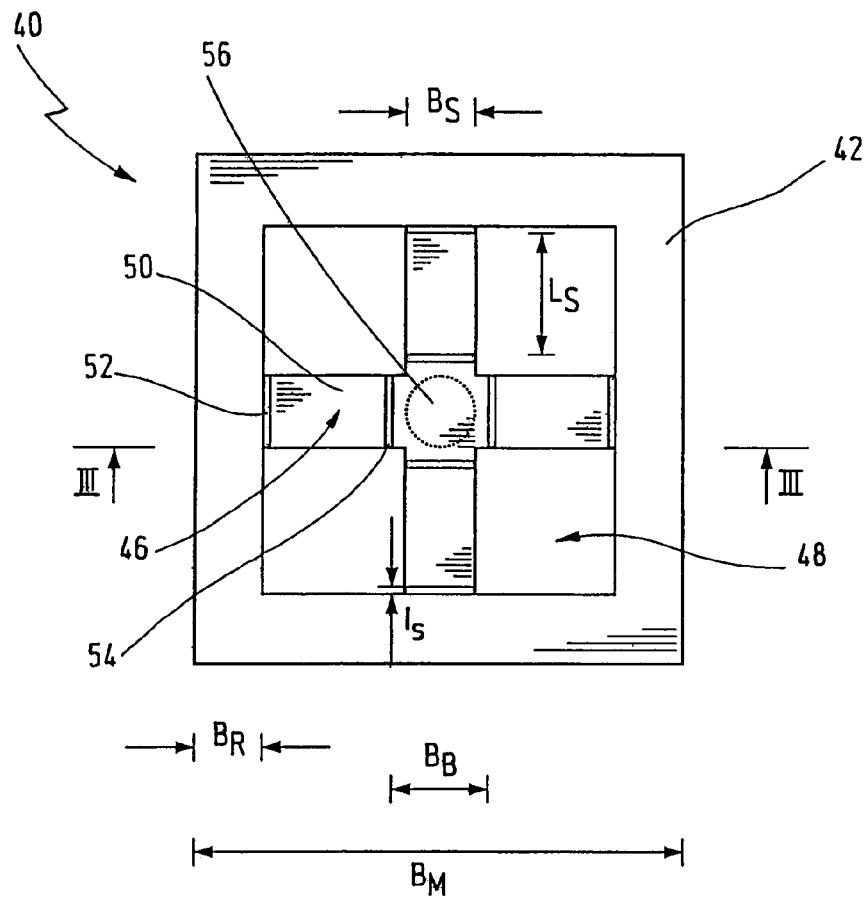
FIG. 2 shows a plan view of an embodiment of the novel sensor module "from underneath", i.e. from that side on which the stylus is arranged.

In FIG. 1, a coordinate measuring machine is designated in its totality by reference number 10. The coordinate measuring machine 10 is illustrated here in the form of a gantry structure, as is typical with many coordinate measuring machines. However, the present invention is not restricted to this form. In principle, the novel sensor module can also be used with other configurations, such as with horizontal-arm measuring machines. It is particularly preferable for the novel sensor module to be used with a coordinate measuring machine as is described in prior international patent application WO 2005/100906 A1, which is incorporated by reference.

This preferred coordinate measuring machine has a movement mechanism for the probe head which differs from the conventional designs and whose fundamental principle is also described in a dissertation by Marc Vermeulen entitled "High Precision 3D-Coordinate Measuring Machine", which can be obtained using the ISBN number 90-386-2631-2. This publication is also incorporated by reference herewith.

For the sake of simplicity, however, the following description refers to the gantry configuration of the coordinate measuring machine illustrated in FIG. 1, because its movement mechanism is easier to understand and more conventional.

The coordinate measuring machine 10 has a base plate 12 on which a gantry 14 is arranged such that it can be moved in the longitudinal direction. This longitudinal direction is normally referred to as the Y axis. A carriage 16 which can be moved in the X direction is arranged on the upper transverse mount of the gantry 14. The carriage is in turn fitted with a ram 18 which can be moved in the Z direction. The reference numbers 20, 22, 24 denote scales from which the respective movement position of the gantry 14, the carriage 16 and the ram 18 can be read in the three spatial directions X, Y, Z. Generally, the scales 20, 22, 24 may be simple measurement scales, which are read by an operator of the coordinate measuring machine 10. However, they are preferably distance measurement transmitters, which are read by machine. The latter is particularly appropriate if the coordinate measuring machine 10 is fitted with the novel sensor module, since this allows extremely high measurement accuracies.

A probe head 26 is arranged in a manner known per se at the lower free end of the ram 18 and is fitted with a stylus 28, which is not illustrated to scale here. The stylus 28 is used to touch defined measurement points on a measurement object 30. For this purpose, the measurement object 30 is arranged on the base plate 12 of the coordinate measuring machine 10. The spatial coordinates of the measurement point that has been touched can be determined from the position of the probe head 26 in the measurement volume of the coordinate measuring machine 10, and from the deflection of the stylus 28 relative to the probe head.

For the sake of completeness, the coordinate measuring machine 10 is in this case illustrated with an evaluation and control unit 32, via which the measurement procedure is controlled and which is also used for processing and outputting of the measured values. A control panel 34 may also optionally be provided, in order to additionally manually control the movements of the probe head 26.

In FIGS. 2 to 5, an embodiment of the novel sensor module is designated by reference number 40 in its totality. The sensor module 40 has a frame 42 which in this case has a square basic shape. A moving part 44, the so-called "boss", is arranged at the center of the frame 42. The moving part 44 is connected to the frame 42 via four webs 46. In a preferred embodiment, the moving part has a cruciform shape (in a plan view), with the free arms of the cross being very short in comparison to the width $B_s$ of the webs 46, that is to say this is a "short-arm cross". The four webs 46 are connected flush to the free arms of the short-arm cross, and continue it to one of the inner faces of the frame 42. Overall, the sensor module 40 thus has a basic structure in the form of a square ring (frame 42), at whose center a cruciform structure (moving part 44 with webs 46) is fitted symmetrically. Those areas within the frame 42 which are neither the moving part 44 nor the web 46 are open, i.e. these areas are square "holes" 48.

Figure 3:
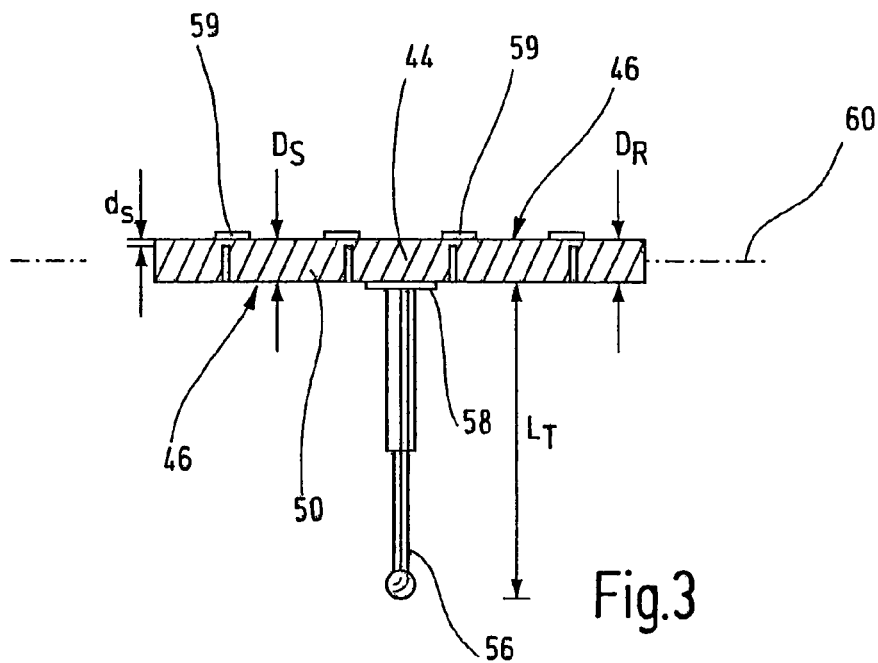
FIG. 3 shows a cross section along line III-III through the sensor module shown in FIG. 2.

Each web 46 has a thick-material, central portion 50 as well as two slots 52, 54, which represent the thin-material areas for the purposes of the present invention. The material thickness of the thick-material portion 50 is designated by $D_s$ in. FIG. 3, while the material thickness of the thin-material portions 52, 54 is designated by $d_S$. The material thickness of the frame 42 is designated by $D_R$ and, in this preferred embodiment, is equal to the thickness $D_S$ of the thick-material portions 50.

The moving part 44 is fitted with a stylus 56 (this is indicated only schematically in FIG. 2, and is not shown at all in FIG. 5, for the sake of clarity), which in the preferred embodiment is attached to the moving part 44 in a non-removable manner. In an embodiment, the stylus 56 is designed with an end flange 58 at the proximal end. The free end of the end flange 58 is adhesively bonded to the moving part 44.

Strain-gauge sensors are illustrated schematically at reference number 59 in FIG. 3. In an embodiment, these sensors are piezo-resistive elements which detect expansion, compression and/or twisting of the webs in the region of the thin-material areas, as is already known from DE 101 08 774 A1 which is incorporated by reference herewith.

The frame 42 may be firmly clamped into a holder (not illustrated here) on the probe head 26, as is shown by way of example in the already cited DE 101 08 774 A1. The frame thus defines a first plane of movement or measurement plane, which is indicated by reference number 60 in FIG. 3. The measurement plane 60 in the coordinate measurement device 10 lies parallel to the movement axes X and Y, as shown in FIG. 1.

In a preferred exemplary embodiment, the sensor module 40 is connected to a specific probe head holder (not illustrated here) to form a physical unit, which is attached to the probe head 26 of the coordinate measuring machine 10 as an entity. One preferred embodiment of such a probe head holder is described in later published WO 2004/068068 which is incorporated by reference. The combination of the sensor module 40 with a probe head holder of this kind allows automated replacement of the stylus, and reliable contact to be made with the strain gauge sensors 59.

In the illustrated embodiments, the length $L_T$ of the stylus 56 is between about 3 mm and about 15 mm, and is preferably about 7 mm. The length $L_S$ of the thick-material portions 50 is in this embodiment about 1.5 mm, and the length $l_S$ of each slot portion 52, 54 is about 0.05 mm to about 0.1 mm. The width $B_S$ of each web 46 is in this embodiment about 0.8 mm. The width $B_B$ of the moving part 44 is about 1.3 mm in a preferred embodiment. The width $B_R$ of the frame 42 is about 1 mm, and the overall width $B_M$ of the sensor module 40 is about 6.5 mm to about 7 mm.

The material thickness $D_S$ of the thick-material web portions 50 is in this case about 0.45 mm, and the material thickness $d_S$ of the thin-material portions 52, 54 is in this case about 0.025 mm.

In an exemplary embodiment, a sensor module 40 with these dimensions was produced from a monocrystalline silicon wafer material by means of a dry-etching process. The above dimensions resulted in a bending stiffness in the Z direction which came close to the bending stiffness in the X and Y directions within a factor of about 3.

Figure 4:
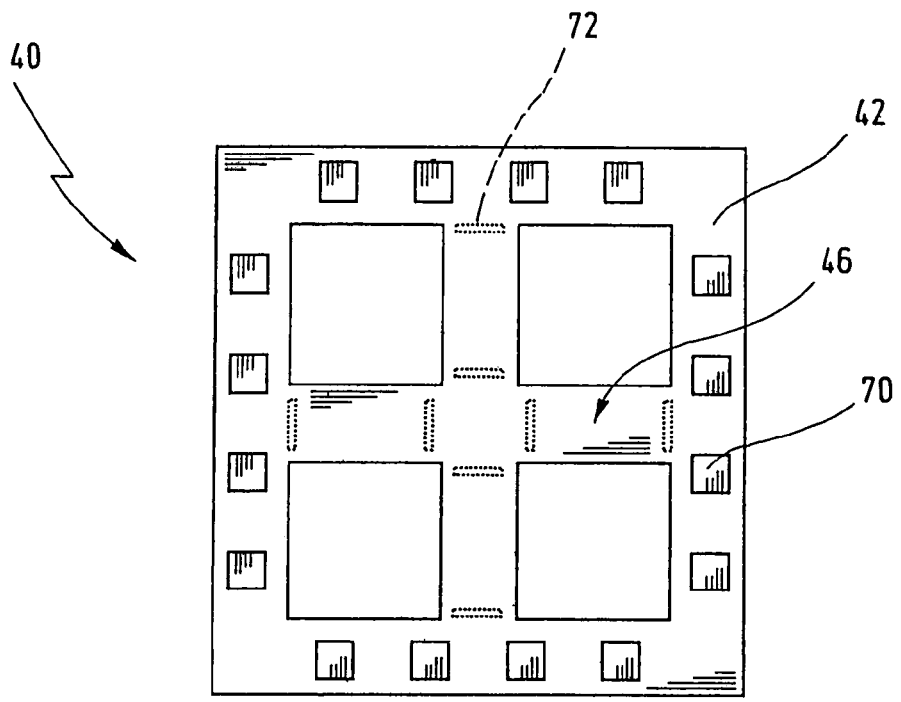
FIG. 4 shows a plan view of the rear face (upper face) of the sensor module shown in FIG. 2.
Figure 5:
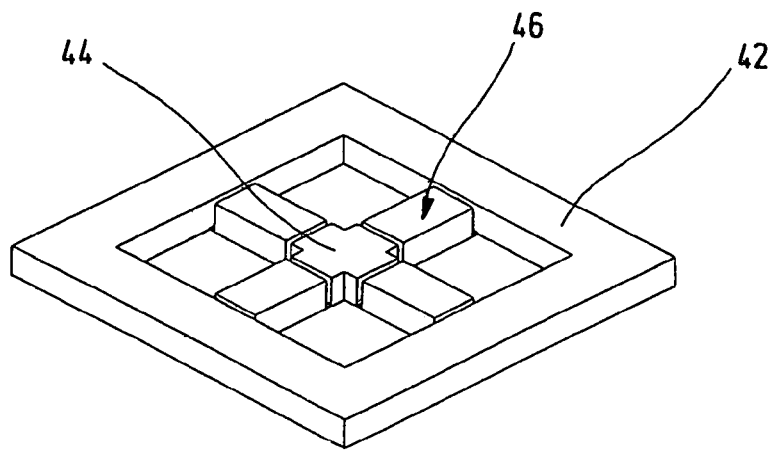
FIG. 5 shows a perspective illustration of the sensor module from FIG. 2, but without a stylus.

The rear view of the sensor module shown in FIG. 4 illustrates preferred contact surfaces 70. In this exemplary embodiment, four contact surfaces 70 are arranged alongside one another on each limb of the frame 42. Overall, the frame 42 thus has 16 contact surfaces 70, with which the strain-gauge sensors 59 make contact when the sensor module 40 is inserted into the probe head holder. The arrangement of the contact surfaces 70 on the rear face of the frame 42 allows to make the contact by spring-loaded pins, which press against the frame 42 from above (or from underneath).

The novel sensor module has been illustrated here with four webs 46, which corresponds to the exemplary embodiment preferred by the applicant at the moment. However, the present invention can also be used for sensor modules which have a different number of webs. For example, the use of thick-material and thin-material web portions can also be applied to a "braces structure" with eight webs, as is known from DE 101 08 774 A1 already cited above. Furthermore, the novel sensor module could also be produced with a lesser number, and/or an odd number of webs, for example with three or five webs. In addition, the use of thin-material and thick-material web portions according to the invention can also be applied to only two webs 46, although this is not preferred at the moment for robustness reasons.

In another embodiment, the thin-material web portions 52, 54 can also be provided with an opening 72, which is indicated by a dotted line in FIG. 4. Each web 46 is then connected to the frame 42 and to the moving part 44 by "point-like" connection points. In this embodiment, the frame 42 and the webs 46 each have side flanks which run virtually perpendicularly to the first measurement plane 60. However, in contrast to this, it is also possible for the side flanks to be formed with an oblique profile, which facilitates the use of a wet-etching method for production of the novel sensor module. Furthermore, the webs 46 may, in contrast to the illustrated embodiment, have a surface which is trapezoidal in a plan view, with the broader side of each trapezium then being arranged on the frame 42, while the narrower trapezium side is seated on the moving part 44.

Figure 6:
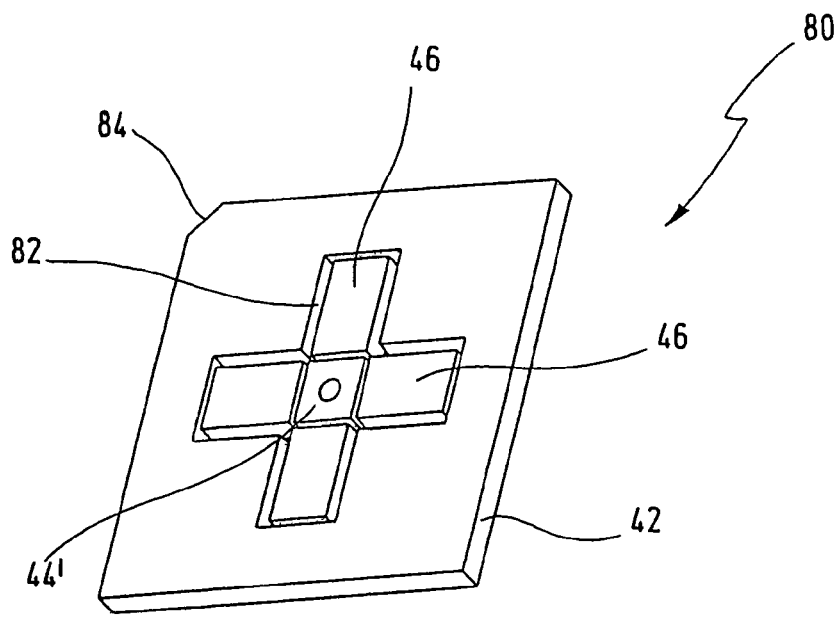
FIG. 6 shows a perspective illustration of another preferred embodiment of the novel sensor module.
Figure 7:
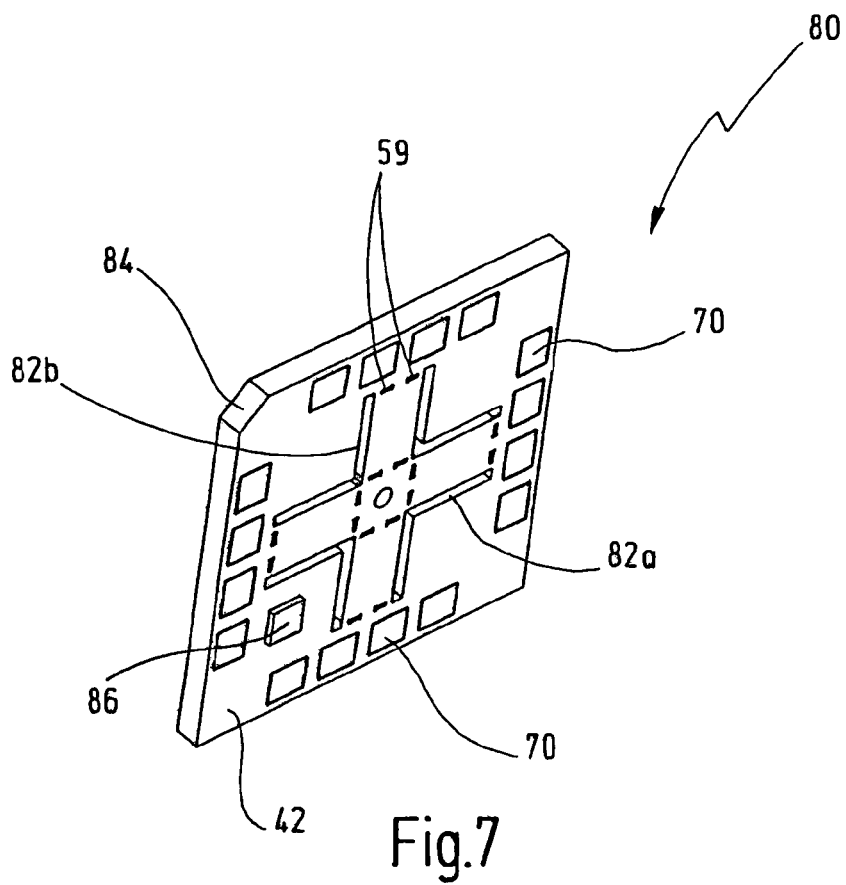
FIG. 7 shows a view from the rear of the sensor module shown in FIG. 6.

FIGS. 6 and 7 show a further preferred embodiment of the novel sensor module (illustrated without a stylus), which is designated by reference number 80 in its totality. Apart from this, same reference symbols denote the same elements as before.

The sensor module 80 has a frame 42 which is separated from the webs only by a groove 82. In contrast to the previous embodiments, the sensor module 80 thus has no large-area openings between the webs and the frame. As can be seen from the plan view in FIG. 6, the groove 82 is a groove which is circumferential around the webs 46 with an accurate fit. In one embodiment, the width of the groove is 0.1 mm. In contrast, from the rear face as shown in FIG. 7, the groove 82 appears in four angled pieces, two of which are annotated here with 82a and 82b. Each piece 82a, 82b has two limbs of equal length, which are arranged perpendicularly to one another. The "missing" pieces of the groove 82 in comparison to the circumferential groove on the front face are the thin-material web portions 52, 54.

In other words, the sensor module is in this case produced largely as a solid body. The webs and the moving parts are implemented by the introduction of narrow slots.

The sensor module 82 has a square base area, with one of the corners of the square (at the reference number 84) being chamfered. The corner 84 thus forms an orientation mark, which ensures that the sensor module 80 is always attached to the coordinate measuring machine 10 in the same, defined installation position. This results in constant high precision, even after replacement of the sensor module.

Two piezo-resistive resistors are designated by reference number 59 (FIG. 7), as being representative of further positions. Four such resistors are in this case arranged on one web, and are connected in a bridge circuit. However, it is also possible to provide a greater or lesser number of resistors such as these on each web. The resistors act as sensors, by means of which the deflections of the stylus, which is not illustrated here, can be determined. As shown in FIG. 7, two resistors are in each case arranged on the rear face of each thin-material web portion 52, 54, and this has been found to be a particularly advantageous embodiment.

Furthermore, reference number 86 denotes a chip which is arranged on one of the "free" frame areas on the rear face of the frame 42. In the preferred exemplary embodiment, the chip is an integrated ID circuit, by means of which each individual sensor module 80 can be unambiguously identified. For example, chip 86 contains an individual tag, which allows specifically associated calibration data to be assigned to each sensor module 80. This data may, for example, be stored in the controller 32 for the coordinate measuring machine 10 and may be called up on the basis of the chip tag as soon as the sensor module has been inserted into the coordinate measuring machine. Alternatively or in addition to this, module-specific data can also be stored directly in the chip 86.

What is claimed is:

1. A sensor module for a probe head of a tactile coordinate measuring machine, the sensor module comprising a frame which forms a stationary module base and thereby defines a first measurement plane, and comprising a moving part configured to move relative to the frame and configured to hold the proximal end of a stylus, wherein the moving part is held on the frame via at least two webs separated from one another, wherein each web has a cross section perpendicularly to the first measurement plane, with the cross section showing a first web portion having a first material thickness and two second web portions having at least a second material thickness, wherein the first web portion is arranged between the two second web portions, and wherein the first material thickness is thicker than the second thickness.

2. The sensor module of claim 1, wherein the moving part is held on the frame via at least four webs having the first and the second web portions.

3. The sensor module of claim 1, wherein the second material thickness is at most 50% of the first material thickness.

4. The sensor module of claim 3, wherein the second material thickness is about 3% to 10% of the first material thickness.

5. The sensor module of claim 1, wherein the webs have a web width and a web length in a view perpendicular to the first measurement plane, with the web width being at least one third of the web length.

6. The sensor module of claim 5, wherein the first and second web portions have approximately the same web width.

7. The sensor module of claim 1, wherein the second web portions are formed by slots extending transversely with respect to the web, with each slot having a slot width in the direction of the web, with each first web portion having a first length in the direction of the web, and wherein the slot width is at most 20% of the first length.

8. The sensor module of claim 7, wherein the slot width is approximately 2% to 10% of the first length.

9. The sensor module of claim 1, wherein the second web portions form connection points of the web to the frame and to the moving part.

10. The sensor module of claim 1, wherein the moving part has a cruciform shape in a view perpendicularly to the first measurement plane.

11. The sensor module of claim 1, wherein the moving part is square in a view perpendicularly to the first measurement plane.

12. The sensor module of claim 1, wherein the frame has a frame thickness which is approximately the same as the first material thickness in a cross section perpendicular to the first measurement plane.

13. The sensor module of claim 1, wherein the frame and the webs each have side flanks, which run substantially perpendicularly to the first measurement plane.

14. The sensor module of claim 1, wherein the frame and the webs are manufactured from a solid semiconductor body.

15. The sensor module of claim 1, wherein the webs are separated from the frame only by a circumferential groove.

16. The sensor module of claim 1, further comprising a stylus attached to the moving part in a non-removable manner.

17. The sensor module of claim 16, wherein the stylus has a stylus length and wherein each web has a web length, with the stylus length being at least twice the web length.

18. The sensor module of claim 1, further comprising a plurality of sensor elements arranged in the area of the webs, and a plurality of electrical contact surfaces for electrically connecting the sensor elements, the contact surfaces being arranged on a side of the frame facing away from the stylus.

19. A probe head for a tactile coordinate measuring machine, the probe head comprising a sensor module having a frame which forms a stationary module base and thereby defines a first measurement plane, and having a moving part configured to move relative to the frame and configured to hold a first end of a stylus, wherein the moving part is held on the frame via at least two separate webs, wherein each web has a thick-material web portion arranged between two thin-material web portions in a cross section perpendicularly to the first measurement plane.

20. The probe head of claim 19, wherein the frame and the webs are manufactured from a solid semiconductor body.

* * * * *

UNITED STATES PATENT AND TRADEMARK OFFICE
CERTIFICATE OF CORRECTION

PATENT NO. : 7,296,364 B2 Page 1 of 1
APPLICATION NO. : 11/656364
DATED : November 20, 2007
INVENTOR(S) : Karl Seitz et al.

It is certified that error appears in the above-identified patent and that said Letters Patent is hereby corrected as shown below:

Title Page,
Item [73] Assignee, "Calr" should be -- Carl --.

Signed and Sealed this

Twenty-ninth Day of July, 2008

JON W. DUDAS
*Director of the United States Patent and Trademark Office*